United States Patent
Shekalim et al.

(10) Patent No.: US 10,959,108 B2
(45) Date of Patent: Mar. 23, 2021

(54) SYSTEM AND METHOD FOR MITIGATING A COVERAGE HOLE FROM A COVERAGE AREA

(71) Applicant: RELIANCE JIO INFOCOMM LIMITED, Mumbai-Maharashtra (IN)

(72) Inventors: Parwiz Shekalim, Mumbai-Maharashtra (IN); Anshul Bhatt, Mumbai-Maharashtra (IN); Arun Karunakaran Nair, Mumbai-Maharashtra (IN); Vikas Kukreja, Haryana (IN); Tareq Amin, Mumbai-Maharashtra (IN); Prithvi Raj Dhaka, Rajasthan (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/339,080

(22) PCT Filed: Sep. 29, 2017

(86) PCT No.: PCT/IB2017/056001
§ 371 (c)(1),
(2) Date: Apr. 3, 2019

(87) PCT Pub. No.: WO2018/065864
PCT Pub. Date: Apr. 12, 2018

(65) Prior Publication Data
US 2019/0239086 A1    Aug. 1, 2019

(30) Foreign Application Priority Data
Oct. 4, 2016   (IN) .............................. 201621033909

(51) Int. Cl.
*H04W 16/18*    (2009.01)
*H04W 24/02*    (2009.01)

(52) U.S. Cl.
CPC .......... *H04W 16/18* (2013.01); *H04W 24/02* (2013.01)

(58) Field of Classification Search
None
See application file for complete search history.

(56) References Cited

U.S. PATENT DOCUMENTS

| 9,113,353 B1 | 8/2015 | Cotanis et al. |
| 2011/0212720 A1* | 9/2011 | Hamalainen .......... H04W 24/02 455/423 |
| 2012/0088498 A1 | 4/2012 | Xiao et al. |

FOREIGN PATENT DOCUMENTS

GB    2481614 A    1/2012

OTHER PUBLICATIONS

International Search Report dated Jan. 24, 2018 distributed by Shubhanshu Gautam of the Indian Patent Office.

* cited by examiner

*Primary Examiner* — Diane L Lo
(74) *Attorney, Agent, or Firm* — Hunton Andrews Kurth LLP (57) ABSTRACT

Embodiments of the present disclosure relate to mitigating at least one coverage hole [108] from a coverage area served by at least one serving cell [102A to 102L]. In a preferred embodiment, a method is disclosed comprising: identifying at least one of at least one first optimum cell and at least one second optimum cell from the at least one serving cell [102A to 102L] based on the coverage hole information based on least one first cell parameter and at least one second cell parameter respectively; determining a final set of target cells comprising at least one final cell and mitigating the at least one coverage hole [108] by modifying the transmission parameter of the at least one final cell based on at least one (Continued)

of the coverage hole information, the at least one first cell parameter and the at least one second cell parameter.

9 Claims, 4 Drawing Sheets

SYSTEM AND METHOD FOR MITIGATING A COVERAGE HOLE FROM A COVERAGE AREA

TECHNICAL FIELD

Embodiments of the present disclosure generally relate to wireless cellular networks. More particularly, the embodiments of the present disclosure relate to a system and a method for mitigating one or more portion of a coverage area not being served by one or more serving cells or the one or more portion of the coverage area without sufficient coverage.

BACKGROUND

With the advancements in communications technology (such as GMS, EDGE, HSPA, LTE, etc.) over recent years, wireless networks are widely deployed to provide communication and content services such as voice, video, data, advertisement, content, messaging, broadcasts, etc. To this end, said wireless networks have multiple access points/networks that are configured to support communications for multiple users by sharing the available network resources. One such network is a UMTS network, a successor to GSM technologies. The UMTS networks currently supports not only various air interface standards such as Wideband-Code Division Multiple Access (W-CDMA), Time Division-Code Division Multiple Access (TD-CDMA), and Time Division-Synchronous Code Division Multiple Access (TD-SCDMA) but also supports various enhanced 3G data communications protocols, such as High Speed Packet Access (HSPA) for providing higher data transfer speeds. However, due to various limitations possessed by the UMTS network, an Evolved Universal Terrestrial Radio Access (E-UTRA), being a radio access network standard, is considered to be a replacement of the UMTS and HSDPA/HSUPA technologies as specified in the 3GPP releases 5 and beyond, since LTETs E-UTRA is an entirely new air interface system with advanced features including higher data rates and lower latency.

The 3GPP specification describes a coverage hole as an area with poor coverage where the pilot signal strength is below the threshold which is required by a User Equipment (UE) to maintain an access to the network, or the SINRs of both serving and neighbor cells is below a level needed to maintain a basic service. Particularly, in the coverage hole, the signal strength of a cellular network experienced by the UE is insufficient to maintain the connectivity and also, there is no coverage from an alternative 3GPP LTE cell. Consequently, the UEs are not able to make network entry or hand overs (HO), or call drops and therefore, may suffer from call drops and Radio Link Failures (RLF). Coverage holes can be caused by physical obstructions (such as new buildings and hills), unsuitable antenna parameters, or inadequate radio frequency (RF) planning.

Accordingly, in order to overcome the aforementioned problems inherent in the existing/outgoing solutions, there exists a need of an efficient mechanism for mitigating existing coverage holes based on various parameters such as coverage hole information, cell parameters, transmission parameter of the serving cells. Further, there exists a need to enhance the coverage area effectively, thereby catering more number of users/user equipments.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure relate to a method for mitigating at least one coverage hole from a coverage area served by at least one serving cell. The method comprises receiving at least one first cell parameter, at least one second cell parameter, a coverage hole information of the at least one coverage hole, and a transmission parameter of the at least one serving cell, wherein the transmission parameter corresponds to one of an increase and a decrease in the coverage area; identifying at least one of at least one first optimum cell and at least one second optimum cell from the at least one serving cell based on the coverage hole information, wherein the at least one first optimum cell is identified based on the at least one first cell parameter, and the at least one second optimum cell is identified based on the at least one second cell parameter; determining a percentage of contribution (POC) for each of the at least one first optimum cell and the at least one second optimum cell identified from the at least one serving cell; determining a final set of target cells from the at least one first optimum cell and the at least one second optimum cell, wherein the final set of target cells includes at least one final cell arranged in one of an ascending and a descending order of priority, and the ascending and the descending order of priority is based on at least one of the percentage of contribution (POC), the at least one first cell parameter and the at least one second cell parameter; replacing the final set of target cells based on one of the ascending and the descending order of priority, wherein the at least one final cell is replaced based on identification of the at least one final cell as an overshooting cell; and mitigating the at least one coverage hole by modifying the transmission parameter of the at least one final cell, wherein the modification is based on at least one of the coverage hole information, the at least one first cell parameter and the at least one second cell parameter.

Further, the embodiments of the present disclosure encompass a system for mitigating at least one coverage hole from a coverage area served by at least one serving cell. The system comprises an input unit configured to receive at least one first cell parameter, at least one second cell parameter, a coverage hole information of the at least one coverage hole, and a transmission parameter of the at least one serving cell, wherein the transmission parameter corresponds to one of an increase and a decrease in the coverage area; and an optimizer unit configured to: identify at least one of at least one first optimum cell and at least one second optimum cell from the at least one serving cell based on the coverage hole information, wherein the at least one first optimum cell is identified based on the at least one first cell parameter, and the at least one second optimum cell is identified based on the at least one second cell parameter; determine a percentage of contribution (POC) for each of the at least one first optimum cell and the at least one second optimum cell identified from the at least one serving cell; determine a final set of target cells from the at least one first optimum cell and the at least one second optimum cell, wherein the final set of target cells includes at least one final cell arranged in one of an ascending and a descending order of priority, and the ascending and the descending order of priority is based on at least one of the percentage of contribution (POC), the at least one first cell parameter and the at least one second cell parameter; replace the final set of target cells based on one of the ascending and the descending order of priority, wherein the at least one final cell is replaced based on identification of the at least one final cell as an overshooting cell; and mitigate the at least one coverage hole by modifying the transmission parameter of the at least one final cell, wherein the modification is based on the coverage hole information.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and a method for mitigating a coverage hole from a coverage area being served by a serving cell. The system receives a plurality of parameters relating to, but not limiting to, cells, coverage hole, transmission parameter and UE (User Equipment) Radio transmission or reception performances, to identify optimum cells from the serving cell based on said received information. Subsequently, the system determines a percentage of contribution (POC) for each of the optimum cells being identified to finally determine a final set of target cells from the optimum cells based on the percentage of contribution (POC). The system further checks if any of the final set of target cells is an overshooting cell. In an event the overshooting cell is identified, the system is configured to replace the final set of target cells based on one of an ascending and a descending order of priority. Once, the overshooting cell is replaced, the system mitigates the coverage hole by simply modifying the transmission parameters of the final cells that were identified. Alternatively, if no overshooting cell is identified, the system is configured to directly mitigate the coverage hole based on said modification/s.

The "at least one serving cell" as used herein may refer to one or more cells which provide a network coverage to a geographic coverage area, thus the geographic area served by the one or more cells is termed as coverage area of the one or more cells. Further, the coverage area may include at least one coverage hole.

The "user equipment" as used herein may include, but not limited to, a smart phone, a feature phone, a tablet, a phablet and any such device obvious to a person skilled in the art. Further, the user equipment may comprise an input means such as a keyboard, an operating system, a memory unit, a display interface, etc.

Figure 1:
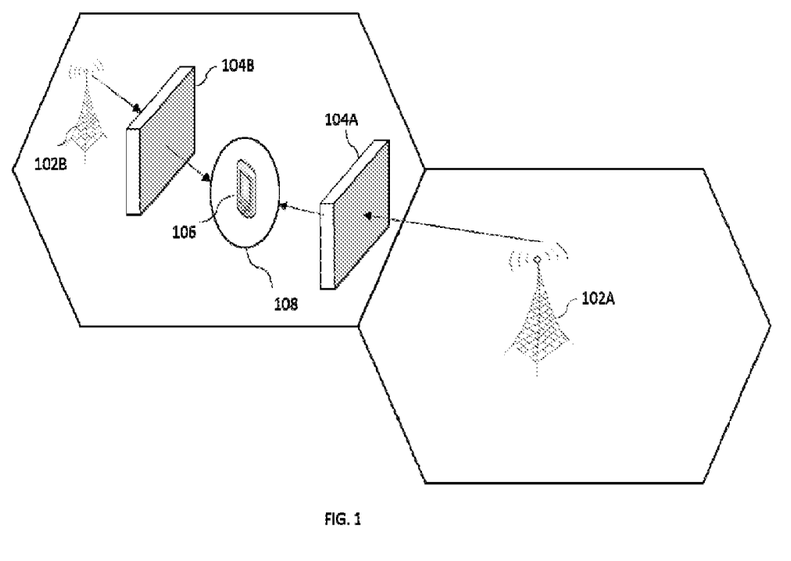
FIG. 1 and FIG. 2 illustrate an exemplary cellular network having a plurality of serving cells and a coverage hole caused either due to obstructions in radio paths of the plurality of serving cells or due to lack of sufficient transmission power of the plurality of serving cells in accordance with an embodiment of the present disclosure.

The "at least one coverage hole" as used herein may refer to the coverage area not being served by the at least one serving cell. More particularly and as illustrated in FIG. 1, the coverage hole [108] may be caused due to physical obstructions including, but not limiting to, buildings [104A, 10413] in the path of and hills or due to unsuitable antenna parameters and/or inadequate radio frequency (RF) planning.

Figure 2:
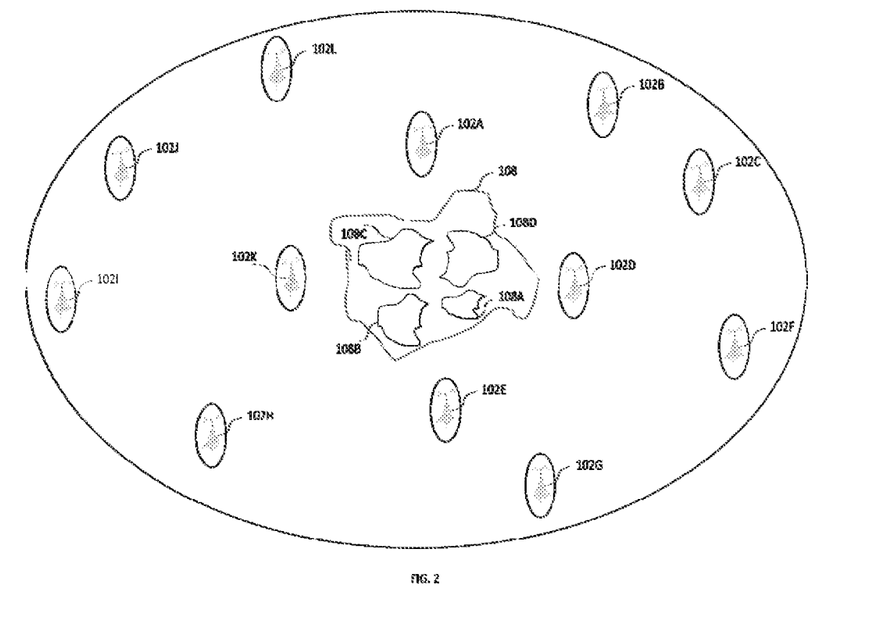

In a preferred embodiment and as illustrated in FIG. 2, a plurality of serving cells [102A to 102L] are deployed in accordance with an embodiment of the present disclosure. In particular, the coverage hole [108] may comprise a plurality of portions [108A, 108B, 108C, 108D] of the coverage hole [108] which are not served by the plurality of serving cells [102A to 102L]. More particularly, the coverage hole may be caused not only because of direct obstacles, but also due to a large distance and/or terrain/collateral characteristics of the area and therefore, may lack sufficient transmission power of the plurality of serving cells. Therefore, the final set of target cells [102A, 102D, 102E, 102K] is identified that are located near the coverage hole [108A, 108B, 108C, 108D] from the serving cells [102A to 102L] and are capable to serve the coverage holes [108A, 108B, 108C, 108D], wherein the identification of the final set of target cells [102A, 102D, 102E, 102K] is explained herein below with the help of FIG. 3.

The "coverage hole information" as used herein may refer to information relating to at least one of a distance of the at least one coverage hole from each of the at least one serving cell and a collateral or terrain information. The collateral information may refer to a vertical height of the coverage hole from a reference plane and therefore, may be categorised into a high collateral information e.g. a geographic location in a high altitude and a low collateral information a geographic location in a low altitude.

Figure 3:
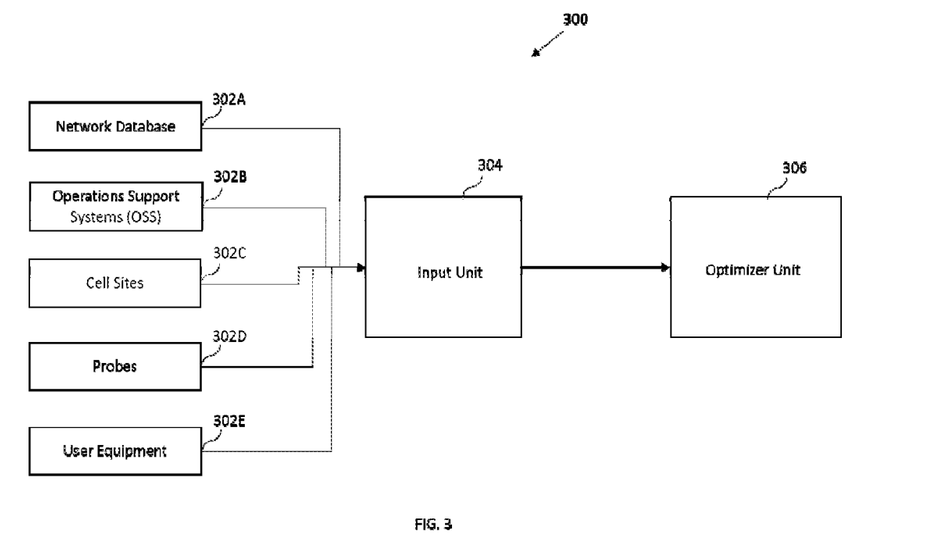
FIG. 3 illustrates a system architecture [300] for mitigating at least one coverage hole from a coverage area served by at least one serving cell, in accordance with an embodiment of the present disclosure.

FIG. 3 illustrates a system architecture for mitigating at least one coverage hole from a coverage area served by at least one serving cell, in accordance with an embodiment of the present disclosure. The system [300] comprises an input unit [304] and an optimiser unit [306].

The input unit [304] may be configured to receive at least one first cell parameter, at least one second cell parameter, the coverage hole information of the at least one coverage hole [108] and a transmission parameter of the at least one serving cell [102A to 102L] from at least one of a network database module [302A], an OSS module [302B], a cell site module [302C], a probes module [302D] and a user equipment parameter module [302D], through one of an automatic update and a manual update in the system [300]. The network database module [302A] may be configured to retrieve a heat map and the coverage hole information corresponding to the at least one coverage hole [108], wherein the coverage hole information relates to at least one of the distance of the at least one coverage hole [108] from each of the at least one serving cell [102A to 102L] and the collateral information. The OSS module [302B] may be configured to retrieve a cell parameter logs/KPI. The cell site parameter module [302C] may be configured to retrieve an information corresponding to trace ports. Further, the probes module [302D] may be configured to retrieve logs and KPI. The user equipment parameter module [302D] may be configured to retrieve information corresponding to reporting of operative users/user equipments along with geo-positioning information of the operative users/user equipments. Moreover, the at least one first cell parameter comprises at least one of a drive test measurement data, a RF coverage power (RSRP), a Reference Signal (RS) strength, a SINR, a Channel Quality Indicator (CQI), a MCS, a call drop rate, a handover success rate, a number of handovers, a RRC re-establishment, a QOS of the at least one serving cell [102A to 102L] and an antenna height. The at least one second cell parameter comprises at least one of a number of users served by the at least one serving cell [102A to 102L], a traffic volume, an area size and a number of sessions of user activity, wherein the user activity may correspond to a communication from or towards the user/user equipment. In an embodiment, the at least one first cell parameter and the at least one second cell parameter are determined using at least one drive test measurement, at least one call summary log and at least one call trace record. The at least one drive test measurement as used herein may correspond to a method for measuring and assessing the coverage area and Quality of Service (QoS) of a mobile radio network carried out by field engineers, while the at least one call summary log and at least one call trace record may correspond to recorded data values of the network wide signalling through which the geo-positioning information data may be determined. Further, the transmission parameter may include, but not limited to, an electrical tilt, a transmission power and a cell range. In a preferred embodiment, the transmission parameter corresponds to one of an increase and a decrease in the coverage area i.e. increasing the transmission power may result in increase in the coverage area served by the at least one serving cell [102A to 102L] whereas decreasing the transmission power may result in decrease in the coverage area served by the at least one serving cell [102A to 102L].

The input unit [304] may further be configured to transmit the at least one first cell parameter, the at least one second cell parameter, the coverage hole information of the at least one coverage hole [108] and the transmission parameter of the at least one serving cell [102A to 102L] to the optimiser unit [306]. Thereafter, the optimiser unit [306] may be configured to identify at least one of at least one first optimum cell and at least one second optimum cell from the at least one serving cell [102A to 102L] based on the coverage hole information. In a preferred embodiment, the at least one first optimum cell is identified based on the at least one first cell parameter, and the at least one second optimum cell is identified based on the at least one second cell parameter. Pursuant to the identification of the at least one first optimum cell and the at least one second optimum cell, the optimiser unit [306] may be configured to determine the percentage of contribution (POC) for each of the at least one first optimum cell and the at least one second optimum cell identified from the at least one serving cell [102A to 102L], wherein the percentage of contribution (POC) corresponds to a percentage of the coverage area served by the at least one first optimum cell and the at least one second optimum cell. In an exemplary embodiment, the percentage of contribution (POC) for each of the at least one first optimum cell and the at least one second optimum cell is determined using a plurality of parameters including, but not limiting to, a potential traffic load, the number of users, existing of good coverage from competitor companies, the percentage of potential contribution area. Subsequently, the optimiser unit [306] may be configured to determine the final set of target cells [102A, 102D, 102E 102K] from the at least one first optimum cell and the at least one second optimum cell, wherein the final set of target cells [102A, 102D, 102E, 102K] includes at least one final cell arranged in one of an ascending and a descending order of priority. In an embodiment, the ascending and the descending order of priority is based on at least one of the percentage of contribution (POC), the at least one first cell parameter and the at least one second cell parameter. For instance, the final set of target cell [102A, 102D, 102E, 102K] identified, is arranged based on the decreasing priority of percentage of contribution (POC) and the least one final cell of the final set of target cell [102A, 102D, 102E 102K] may be arranged in the following manner such that the 102A serving cell may have maximum percentage of contribution (POC) whereas 102K serving cell may have least percentage of contribution (POC):

Priority 1: 102A
Priority 2: 102D
Priority 3: 102E
Priority 4: 102K

Further, the optimiser unit [306] may be configured to check whether or not the at least one final cell of the final set of target cells [102A, 102D, 102E 102K] is an overshooting cell. In an embodiment, the overshooting cell is identified in an event the coverage area and the number of users served by the at least one final cell of the final set of target cells [102A, 102D, 102E 102K] exceeds a pre-defined value, wherein the predefined value is defined manually or by the system [300]. Therefore, the overshooting cell may correspond to that serving cell that serves the user/user equipment [106] in a range beyond the pre-defined coverage range. In an event, no overshooting cell is identified, the optimiser unit [306] may be configured to modify the transmission parameter of the at least one final cell of the final set of target cells [102A, 102D, 102E 102K]. Alternatively, if the overshooting cell is identified, the optimiser unit [306] may be configured to first replace the final set of target cells [102A, 102D, 102E 102K] based on one of the ascending and the descending order of priority, wherein the at least one final cell of the final set of target cells [102A, 102D, 102E 102K] is replaced with the final cell having a second highest priority/immediate highest priority. For instance, the at least one final cell of the final set of target cell [102A, 102D, 102E 102K] may now be arranged in the following manner such that the 102A serving cell identified as the overshooting cell may be replaced, allotting the 102D serving cell the highest priority:

Priority 1: 102D
Priority 2: 102E
Priority 3: 102K
Priority 4: N/A

Pursuant to the replacement of the overshooting cell, the optimiser unit [306] may be further configured to modify the transmission parameter of the at least one final cell of the final set of target cells [102D, 102E 102K].

Further, after modification of the transmission parameter of the at least one final cell of the final set of target cells [102D, 102E 102K] and [102A, 102D, 102E 102K] in an event the overshooting cell is identified and not identified respectively, key evaluation parameters may be analysed to determine a change in the electrical tilt for each of the at least one final cell of the final set of target cells [102A, 102D, 102E 102K], wherein the change in the electrical tilt may be computed/determined by using the following notation:

Change in Electrical Tilt=ArcTan{((Cell Height+ Mean Sea Level at Cell Position)−(Receiver Height+Mean Sea Level At Receiver Position)/ (Distance of the cell from the coverage hole)}− ArcTan{((Cell Height+Mean Sea Level at Cell Position)−(Receiver Height+Mean Sea Level At Receiver Position))/(Distance of the farthest point of the cell best server plot lying within the coverage hole)}.

Furthermore, after determination of the change in electrical tilt, the modification of the transmission parameter may be further analysed based on key evaluation parameters listed in the following table, wherein the key evaluation parameters may be broadly selected from the at least one first cell parameter:

TABLE 1

| Effect on Key Performance Indicators | Coverage Hole Area | Further action to be performed |
| --- | --- | --- |
| Key Performance Indicators improving | No coverage hole | Ideal Condition - Process Complete |
| Key Performance Indicators improving | coverage hole area shrink | Continue to uptilt by one unit more |
| Key Performance Indicators improving | No change in coverage area | Continue to uptilt by one unit more |
| Key Performance Indicators improving | coverage hole area increased | Revert back to original configuration |
| Key Performance Indicators deteriorating | No coverage hole | Reduce the tilt angle by 50% of previous change. If no tilt applied, reduce RS boosting from twice to 1.5 times of the PDSCH EPREs |
| Key Performance Indicators deteriorating | coverage hole area shrink | Reduce the tilt angle by 50% of previous change. If no tilt applied, reduce RS boosting from twice to 1.5 times of the PDSCH EPREs |
| Key Performance Indicators deteriorating | No change in coverage area | Revert back to original configuration |
| Key Performance Indicators deteriorating | coverage hole area increased | Revert back to original configuration |

As illustrated in above table (Table 1), different actions may be performed based on the different variation in Key Performance Indicators and the coverage hole area, wherein said actions may be performed based on a validation mechanism as explained herein after. For instance, ideal condition corresponds to an event where the Key Performance Indicators are improving with no coverage holes, wherein process of eliminating the coverage hole is completed with no action pending. In another exemplary scenario where there is reduction/deterioration in the Key Performance Indicators along with either reduction/deterioration in the coverage hole area or no coverage hole area, then the electrical tilt angle may be reduced by 50 percent of the previous change in electrical tilt; however, if the previous change in electrical tilt is minimal, then RS power/transmission power may be reduced from twice to 1.5 times of the PDCH EPREs. In another exemplary scenario, where the Key Performance Indicators are improved with reduction/deterioration in the coverage hole area, then the electrical tilt is either increased or decreased by 1 unit, while in another scenario such as increase in both the Key Performance Indicators as well as the coverage hole area, then the configuration may be reverted back to the original. Similarly, in an event there is decrease in the Key Performance Indicators with either no change in coverage hole area or increase in the coverage hole area, then also the configuration may be reverted back to the original.

Figure 4:
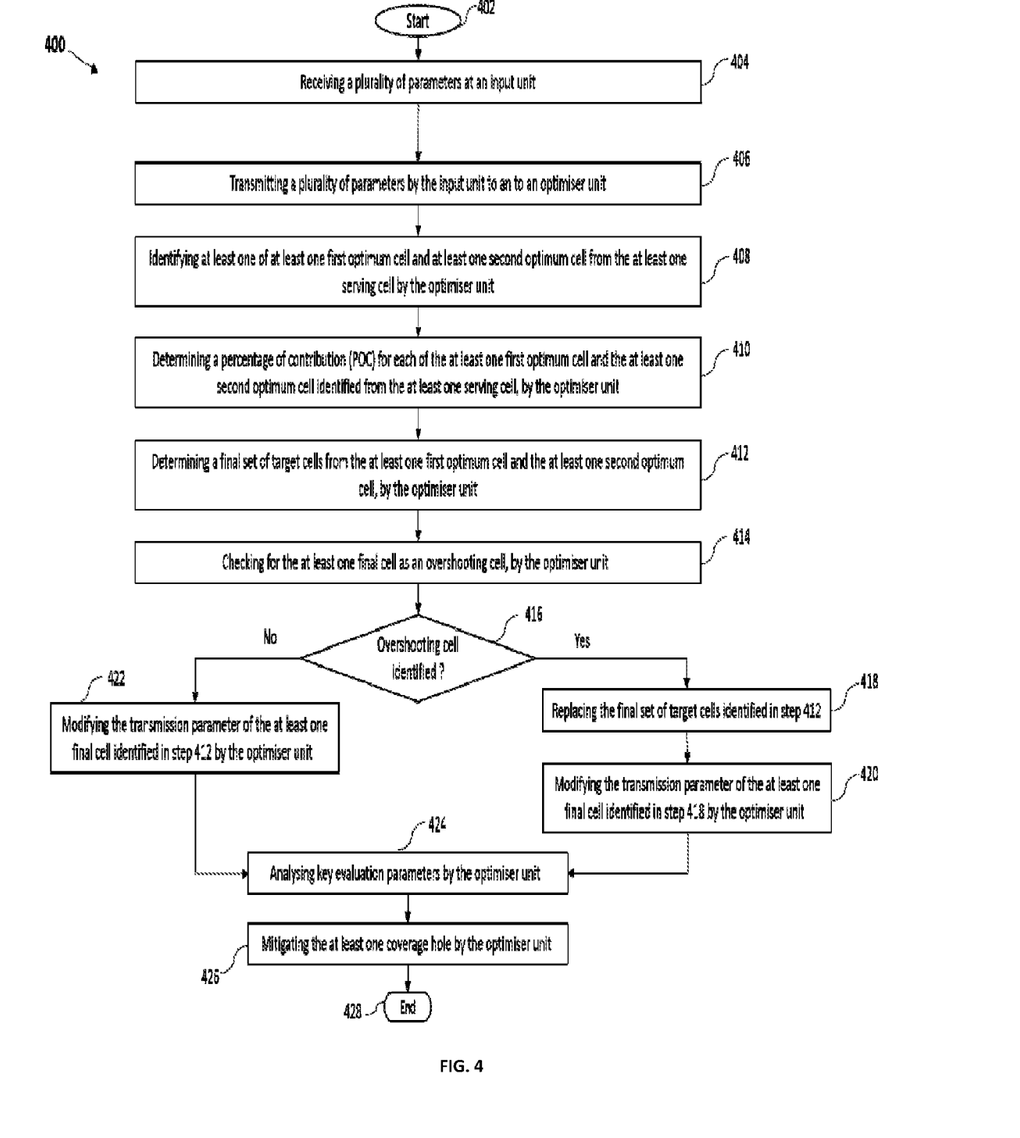
FIG. 4 illustrates an exemplary method flow diagram [400] comprising the method for mitigating at least one coverage hole from a coverage area served by at least one serving cell, in accordance with an embodiment of the present disclosure.

As illustrated in FIG. 4, the present disclosure encompasses an exemplary method [400] for mitigating at least one coverage hole [108] from the coverage area served by the at least one serving cell [102A to 102L] in accordance with an embodiment of the present disclosure. The following method [400] includes detailed steps involved in mitigating the at least one coverage hole [108] from the coverage area, wherein the method [400] may initiate at step 402 where the at least one coverage hole [108] is being identified and the user/user equipment [106] is not able to avail any service in said at least one coverage hole [108].

At step 404, the input unit [304] may receive the at least one first cell parameter, the at least one second cell parameter, the coverage hole information of the at least one coverage hole [108] and the transmission parameter of the at least one serving cell [102A to 102L] from the at least one of a network database module [302A], the OSS module [302B], the cell site module [302C], the probes module [302D] and the user equipment parameter module [302D], through one of the automatic update and the manual update in the system [300].

At step 406, the input unit [304] may transmit the at least one first cell parameter, the at least one second cell parameter, the coverage hole information of the at least one coverage hole [108] and the transmission parameter of the at least one serving cell [102A to 102L] to the optimiser unit [306] to the optimiser unit [306]. In an embodiment, said transmission may be either periodic or real time.

Thereafter, at step 408, the optimiser unit [306] may identify the at least one of at least one first optimum cell and the at least one second optimum cell from the at least one serving cell [102A to 102L] based on the coverage hole information. In a preferred embodiment, the at least one first optimum cell is identified based on the at least one first cell parameter, while the at least one second optimum cell is identified based on the at least one second cell parameter. Therefore, the at least one first optimum cell is identified based on the coverage hole information and the at least one first cell parameter, while the at least one second optimum cell is identified based on the coverage hole information and the at least one second cell parameter.

At step 410, the optimiser unit [306] may determine the percentage of contribution (POC) for each of the at least one first optimum cell and the at least one second optimum cell identified from the at least one serving cell [102A to 102L], wherein the percentage of contribution (POC) corresponds to the percentage of the coverage area served by the at least one first optimum cell and the at least one second optimum cell. In an exemplary embodiment, the percentage of contribution (POC) for each of the at least one first optimum cell and the at least one second optimum cell is determined using the potential traffic load, the number of users, existing of good coverage from competitor companies, the percentage of potential contribution area.

At step 412, the optimiser unit [306] may determine the final set of target cells [102A, 102D, 102E 102K] from the at least one first optimum cell and the at least one second optimum cell, wherein the final set of target cells [102A, 102D, 102E, 102K] includes at least one final cell arranged in one of the ascending and the descending order of priority. In an embodiment, the ascending and the descending order of priority is based on at least one of the percentage of contribution (POC), the at least one first cell parameter and the at least one second cell parameter. For example, the final set of target cell [102A, 102D, 102E, 102K] identified, is arranged based on the decreasing priority of percentage of contribution (POC) and the least one final cell of the final set of target cell [102A, 102D, 102E 102K] may be arranged in the following manner such that the 102A serving cell may have maximum percentage of contribution (POC) whereas the 102K serving cell may have least percentage of contribution (POC):

Priority 1: 102A
Priority 2: 102D
Priority 3: 102E
Priority 4: 102K

Further, at step 414 and step 416, the optimiser unit [306] may check whether or not the at least one final cell of the final set of target cells [102A, 102D, 102E 102K] is the overshooting cell. In an embodiment, the overshooting cell is identified in an event the coverage area and the number of users served by the at least one final cell of the final set of target cells [102A, 102D, 102E 102K] exceeds the pre-defined value, wherein the predefined value is defined manually or by the system [300]. Therefore, the overshooting cell may correspond to that serving cell that serves the user/user equipment [106] in a range beyond the pre-defined coverage range. In an event, the overshooting cell is identified, the method [400] may lead to step 418. Alternatively, the method [400] may lead to step 422.

At step 418, where the overshooting cell is identified, the optimiser unit [306] may first replace the final set of target cells [102A, 102D, 102E 102K] based on one of the ascending and the descending order of priority, wherein the at least one final cell of the final set of target cells [102A, 102D, 102E 102K] is replaced with the final cell having a second highest priority/immediate highest priority. For instance, the at least one final cell of the final set of target cell [102A, 102D, 102E 102K] may now be arranged in the following manner such that the 102A serving cell identified as the overshooting cell may be replaced, allotting the 102D serving cell the highest priority:

Priority 1: 102D
Priority 2: 102E
Priority 3: 102K
Priority 4: N/A

At step 420, the optimiser unit [306] may modify the transmission parameter of the at least one final cell of the final set of target cells [102D, 102E 102K] identified after replacement at the step 418.

At step 422, where no overshooting cell in identified, the optimiser unit [306] may modify the transmission parameter of the at least one final cell of the final set of target cells [102A, 102D, 102E 102K] identified at the step 412.

Further, at step 424 and after accomplishment of any of the step 420 and step 422, the optimiser unit [306] may modify the transmission parameter of the at least one final cell of the final set of target cells [102A, 102D, 102E 102K] or [102D, 102E 102K] by determining the change in the electrical tilt for each of the at least one final cell of the final set of target cells [102A, 102D, 102E 102K], wherein the change in the electrical tilt may be computed/determined by using the following notion:

Change in Electrical Tilt=ArcTan{((Cell Height+Mean Sea Level at Cell Position)–(Receiver Height+Mean Sea Level At Receiver Position)/(Distance of the cell from the coverage hole)}–ArcTan{((Cell Height+Mean Sea Level at Cell Position)–(Receiver Height+Mean Sea Level At Receiver Position))/(Distance of the farthest point of the cell best server plot lying within the coverage hole)}

Furthermore, after determination of the change in electrical tilt, the modification of the transmission parameter may be further analysed based on key evaluation parameters listed in the Table 1, wherein the key evaluation parameters may be broadly selected from the at least one first cell parameter. As illustrated in the Table 1, different actions may be performed based on the different variation in Key Performance Indicators and the coverage hole area, wherein said actions may be performed based on a validation mechanism as explained herein after. For instance, ideal condition corresponds to an event where the Key Performance Indicators are improving with no coverage holes, wherein process of eliminating the coverage hole is completed with no action pending. In another exemplary scenario where there is reduction/deterioration in the Key Performance Indicators along with either reduction/deterioration in the coverage hole area or no coverage hole area, then the electrical tilt angle may be reduced by 50 percent of the previous change in electrical tilt; however, if the previous change in electrical tilt is minimal, then RS power/transmission power may be reduced from twice to 1.5 times of the PDCH EPREs. In another exemplary scenario, where the Key Performance Indicators are improved with reduction/deterioration in the coverage hole area, then the electrical tilt is either increased or decreased by 1 unit, while in another scenario such as increase in both the Key Performance Indicators as well as the coverage hole area, then the configuration may be reverted back to the original. Similarly, in an event there is decrease in the Key Performance Indicators with either no change in coverage hole area or increase in the coverage hole area, then also the configuration may be reverted back to the original.

Furthermore, at step 426 and after accomplishment of step 424, the optimising unit [306], may mitigate the coverage hole based on said step 424. The method [400] may then terminate at step 428.

Thus, the present disclosure encompasses a system [300] and method [400] for mitigating the at least one coverage hole [108] from the coverage area served by the at least one serving cell [102A to 102L]. Said method [400] and system [300] in turn increases overall aggregate network performance and throughputs of the cells. Also, the users/user equipments [106] will be able to receive seamless services simultaneously or sequentially without any latency or call drops in the coverage area/s.

Though a limited number of the input unit [304], the optimizer unit [306], the network database module [302A], the OSS module [302B], the cell site module [302C], the probes module [302D] and the user equipment parameter module [302D], the users/user equipments [106] and the components/sub systems therein, have been shown in the figures; however, it will be appreciated by those skilled in the art that the system [300] of the present disclosure encompasses any number and varied types of said entities/elements, the input unit [304], the optimizer unit [306], the network database module [302A], the OSS module [302B], the cell site module [302C], the probes module [302D] and the user equipment parameter module [302D], the users/user equipments [106] and the components/sub systems therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method for mitigating at least one coverage hole from a coverage area served by a plurality of serving cells, wherein the method comprising:
 receiving at least one first cell parameter, at least one second cell parameter, a coverage hole information of the at least one coverage hole, and a transmission parameter of the plurality of serving cells, wherein the transmission parameter corresponds to one of an increase and a decrease in the coverage area;
 identifying each of at least one first optimum cell and at least one second optimum cell from the plurality of serving cells based on the coverage hole information, wherein
  the at least one first optimum cell is identified based on the at least one first cell parameter, and
  the at least one second optimum cell is identified based on the at least one second cell parameter;
 determining a percentage of contribution (POC) for each of the at least one first optimum cell and the at least one second optimum cell identified from the plurality of serving cells, wherein the percentage of contribution (POC) corresponds to a percentage of the coverage area served by the at least first optimum cell and the at least one second optimum cell;
 determining a final set of target cells from each of the at least one first optimum cell and the at least one second optimum cell, wherein
  the final set of target cells includes at least a plurality of final cells arranged in one of an ascending and a descending order of priority, and
  the ascending and the descending order of priority is based on at least one of the percentage of contribution (POC), the at least one first cell parameter and the at least one second cell parameter;
 replacing at least one final cell in the final set of target cells by another of the at last one final cell from the final set of target cells, based on one of the ascending and the descending order of priority, wherein the at least one final cell is replaced based on identification of the at least one final cell as an overshooting cell, wherein the overshooting cell is identified by the at least one final cell exceeding a pre-defined value; and
 mitigating the at least one coverage hole by modifying the transmission parameter of the at least a plurality of final cells of the final set of target cells, wherein the modification is based on at least one of the coverage hole information, the at least one first cell parameter and the at least one second cell parameter.

2. The method as claimed in claim 1, further comprising modifying the transmission parameter of the at least a plurality of final cells using a validation mechanism.

3. The method as claimed in claim 1, wherein the at least one coverage hole corresponds to the coverage area not served by the plurality serving cells.

4. The method as claimed in claim 1, wherein the at least one first cell parameter comprises at least one of a drive test measurement data, a RF coverage power (RSRP), a Reference Signal (RS) strength, a SINR, a Channel Quality Indicator (CQI), a MCS, a call drop rate, a handover success rate, a number of handovers, a RRC re-establishment, a QOS of the at least one serving cell and an antenna height.

5. The method as claimed in claim 1, wherein the at least one first cell parameter and the at least one second cell parameter are determined using at least one drive test measurement, a network database module, an OSS module, a cell site module, a probes module and a user equipment parameter module, at least one call summary log and at least one call trace record.

6. The method as claimed in claim 1, wherein the at least one second cell parameter comprises at least one of a number of users served by the plurality of serving cells, a traffic volume, an area size and a number of sessions of a user activity.

7. The method as claimed in claim 1, wherein the coverage hole information of the at least one coverage hole comprises at least one of a distance of the at least one coverage hole from each of the plurality of serving cells and a collateral information.

8. The method as claimed in claim 1, wherein the transmission parameter of the plurality of serving cells comprises at least one of an electrical tilt, a transmission power and a cell range.

9. A system for mitigating at least one coverage hole from a coverage area served by a plurality of serving cells, wherein the system comprising:
 an input unit configured to receive at least one first cell parameter, at least one second cell parameter, a coverage hole information of the at least one coverage hole, and a transmission parameter of the at least one serving cell, wherein the transmission parameter corresponds to one of an increase and a decrease in the coverage area; and
 an optimizer unit configured to:
  identify at least one first optimum cell and at least one second optimum cell from the plurality of serving cells based on the coverage hole information, wherein
   the at least one first optimum cell is identified based on the at least one first cell parameter, and
   the at least one second optimum cell is identified based on the at least one second cell parameter;
  determine a percentage of contribution (POC) for each of the at least one first optimum cell and the at least one second optimum cell identified from the plurality of serving cells, wherein the percentage of contribution (POC) corresponds to a percentage of the coverage area served by one of the at least one first optimum cell and the at least one second optimum cell;
  determine a final set of target cells from the at least one first optimum cell and the at least one second optimum cell, wherein
   the final set of target cells includes at least a plurality of final cells arranged in one of an ascending and a descending order of priority, and the ascending and the descending order of priority is based on at least one of the percentage of contribution (POC), the at least one first cell parameter and the at least one second cell parameter;
  replace at least one final cell in the the final set of target cells by at least one another final cell from the final set of target cells, based on one of the ascending and the descending order of priority, wherein the at least one final cell is replaced based on identification of the at least one final cell as an overshooting cell, wherein the overshooting cell is identified in an event the coverage area and the number of users served by the at least one final cell exceeds a pre-defined value; and mitigate the at least one coverage hole by modifying the transmission parameter of the at least a plurality of final cells of the final set of target cells, wherein the modification is based on the coverage hole information.

* * * * *